No. 682,833. Patented Sept. 17, 1901.
J. PERKS & W. C. SALMON.
MANUFACTURE OF HOES.
(Application filed July 14, 1899.)
(No Model.) 2 Sheets—Sheet 1.

Witnesses:
Inventors:
John Perks
William C. Salmon

THE NORRIS PETERS CO., PHOTO-LITHO., WASHINGTON, D. C.

No. 682,833. Patented Sept. 17, 1901.
J. PERKS & W. C. SALMON.
MANUFACTURE OF HOES.
(Application filed July 14, 1899.)
(No Model.) 2 Sheets—Sheet 2.

Witnesses:
J. H. Himan
Peter N. Ross

Inventors:
John Perks
William C. Salmon
by Henry Connett
Their Attorney

UNITED STATES PATENT OFFICE.

JOHN PERKS AND WILLIAM CHARLES SALMON, OF WOLVERHAMPTON, ENGLAND, ASSIGNORS TO JOHN PERKS AND SONS, OF SAME PLACE.

MANUFACTURE OF HOES.

SPECIFICATION forming part of Letters Patent No. 682,833, dated September 17, 1901.

Application filed July 14, 1899. Serial No. 723,751. (No model.)

*To all whom it may concern:*

Be it known that we, JOHN PERKS and WILLIAM CHARLES SALMON, subjects of the Queen of Great Britain, residing at Wolverhampton, in the county of Stafford, England, have invented certain new and useful Improvements in the Manufacture of Hoes, of which the following is a specification.

This invention relates to the lighter description of hoes, and has for its object the production of hoes in which lightness and strength are combined in a more satisfactory manner than heretofore and an improved method of manufacture whereby the cost is greatly reduced compared with the cost of manufacturing light hoes in any ordinary manner.

The hoes are each constituted entirely of sheet metal, with the eye formed solid with the blade, and in order that the eye may be strengthened it is preferred that the metal of the outer edge thereof shall be curled over, forming what is commonly known as a "wired" edge.

According to the improved method of manufacture, which is the important feature of the invention, the blanks to form the hoes are first cut to the required size from sheet iron or steel. In the formation of the eyes a portion of the metal of each blank is first drawn down while cold for a portion of the required depth of the eye in a drawing-press by means of tools which comprise a pressure-plate, between which and the lower tool the flat metal is drawn as it passes toward the opening of the lower tool. The eyes thus partially formed are afterward completed by means of tools which draw down the metal to the required depth and form the eyes to the required diameter and which comprise tools which punch out metal from the closed ends of the sockets which are first found in the production of the eyes. It is preferred also to strengthen the front end of each eye by curling over the edge of the metal.

Figure 1:
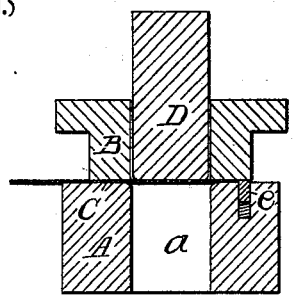
Figure 4:
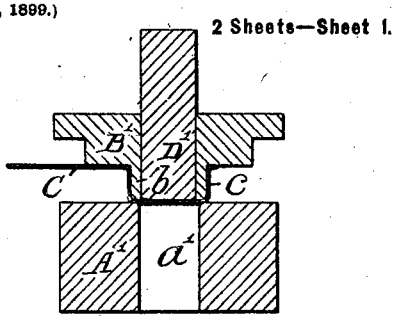
Figure 2:
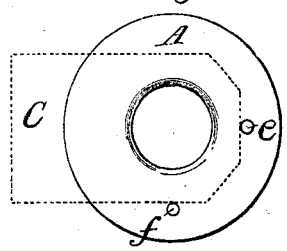
Figure 5:
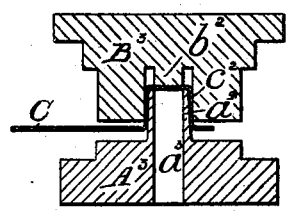
Figure 3:
Figure 6:
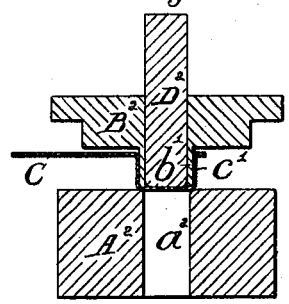
Figure 8:
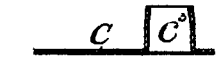
Figure 7:
Figure 10:
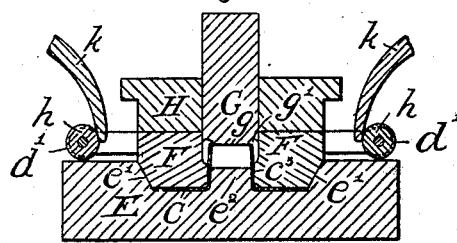
Figure 12:
Figure 11:
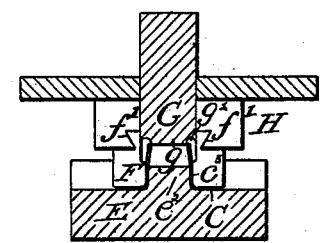
Figure 13:
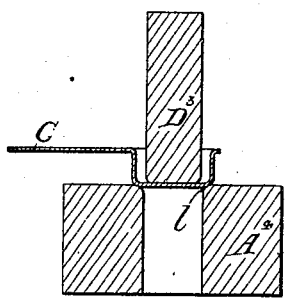
Figure 14:
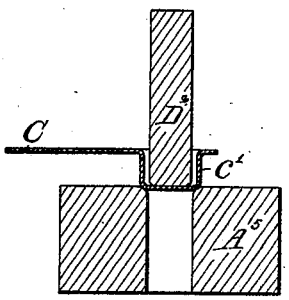

In the drawings which serve to illustrate this invention, Figure 1 represents in vertical section the first set of tools by which a blank is operated upon to produce a hoe-eye, the blank being shown in position previously to the operation of the plunger thereon. Fig. 2 is a plan of the bottom tool shown by Fig. 1, the outline of the blank when in place upon such tool being indicated by broken lines. Fig. 3 is a longitudinal section through the middle of the blank after it has been operated upon by the first set of tools. Fig. 4 is a corresponding view to Fig. 1, but illustrates the second set of tools. Fig. 5 is a longitudinal section through the middle of the blank after the same has been operated upon by the second set of tools. Fig. 6 is a view also corresponding to Fig. 1, but illustrates the third set of tools. Fig. 7 is a longitudinal section through the middle of the blank after the same has been operated upon by the third set of tools. Fig. 8 is a corresponding view also to Fig. 1, but illustrates the fourth set of tools. Fig. 9 is a longitudinal section through the middle of the blank after the same has been operated upon by the fourth set of tools. Fig. 10 is a vertical section through the center of the tools used for curling the edge of the eye formed by the previous sets of tools. Fig. 11 is a vertical section through the center of the tools shown by Fig. 10, but taken at right angles to such figure. Fig. 12 is a longitudinal section through the blank after the edge of the eye formed thereon has been curled by the tools shown by Figs. 10 and 11. Fig. 13 is a view corresponding to Fig. 4, showing a pair of tools which may be used in lieu of the set of tools shown by Fig. 4; and Fig. 14 is a view corresponding to Fig. 6, showing a pair of tools which may be used in lieu of the set of tools shown by Fig. 6.

Of the first set of tools, (shown by Figs. 1 and 2,) A is the bottom or bed tool, having an opening *a* formed therethrough, into which the metal for the formation of the eye of the hoe is pressed. B is a pressure plate or block which presses directly down upon the blank C, and D is a plunger which passes through the tool B and carries a portion of the metal of the blank down into the opening *a* of the bottom tool. A close-ended socket *c*, Fig. 3, is thus produced by the operation of these tools. The socket is readily pushed up out of the bottom tool A after the plunger D and pressure-plate B have been raised by any suitable knock-up device, such as a vertical rod operated by a treadle, which is employed for pushing up similar articles from the bottom tool of a drawing-press. *e f* are gages to facilitate placing the blank C in proper position upon the bottom tool. These gages are of a usual character, consisting of pins which can yield downward under the pressure of the tool B against the pressure of springs.

Of the tools shown by Fig. 4, A' is the bottom tool, B' the pressure plate or block, and D' the plunger. The tool B' is formed with a portion $b$, which is just an easy fit within the socket $c$ of the blank which has been formed by the previous tools. The blank is first placed with its socket around the part $b$ of the tool B', and then the tool B' is brought down to press the bottom of the socket between itself and the upper face of the tool A', and the plunger D' then carries down the metal of the socket $c$ into the opening $a'$ of the tool A', forming a socket $c'$, Fig. 5, of a less diameter and correspondingly deeper than the socket $c$. The blank C in the form shown by Fig. 5 is next transferred to the tools shown by Fig. 6, which correspond in all particulars with the tools shown by Fig. 4, except that the part $b'$ of the pressure plate or block $B^2$ is of a diameter to fit just easily within the socket $c'$ of the blank C, and the opening $a^2$ of the bottom tool $A^2$ and the plunger $D^2$ are of a smaller diameter than the opening $a'$ and plunger D', respectively. The tools shown by Fig. 6 form the socket $c'$ of the blank into a socket $c^2$, Fig. 7, which is smaller in diameter and correspondingly deeper than the socket $c'$. The blank C in the form shown by Fig. 7 is next transferred to the tools shown by Fig. 8. Of these tools the lower tool $A^3$ is formed with an annular portion $a^4$, which is slightly tapered and projects upward around its central axis and is of a diameter at its lower end which allows the socket $c^2$ to be just passed down thereover when inverted, and the upper tool $B^3$ is formed with a central opening which will just receive the socket $c^2$, and in the inner end of this opening is formed a punch $b^2$. The blank C is first placed with its socket $c^2$ over the annular projection $a^4$ of the bottom tool, and the upper tool $B^3$ is then brought down. The punch $b^2$ punches out a wad of metal from the end of the socket $c^2$ into the opening $a^3$ of the bottom tool $A^3$, and the further descent of the tool $B^3$ causes it to press upon the flat surface of the blank C and to carry such blank down onto the upper face of the tool $A^3$, with the result that the metal at the end of the socket $c^2$, which immediately surrounds the opening left by cutting out the wad of metal, is drawn down over the upper corner of the projection $a^4$ of the tool $A^3$ onto the straight portion of such projection, thus forming the socket $c^2$ into an open-ended socket or eye $c^3$, as shown by Fig. 9. The projection $a^4$ of the tool $A^3$ is of course made to the height which will allow of the metal being carried down in the manner described after the wad of metal has been punched out from the inner end of the socket by the punch $b^2$. The socket $c^3$ as formed by these tools is somewhat tapered, as shown. If it is desired to curl the outer edge of the socket or eye $c^3$, the blank C in the form shown by Fig. 9 is next transferred to the tools shown by Figs. 10 and 11. Of these tools, E is the bottom or bed tool, and $e^2$ a stud which projects upward therefrom for a portion of the height of the socket or eye $c^3$ and is of a diameter to fit just easily within the inner end of the socket, the inner end being now considered as the end which joins into the other portion of the blank and not, as previously, the end which is more remote therefrom. The blank C is placed flat down upon the tool E with its socket or eye $c^3$ around the stud $e^2$, the upper portion of the socket or eye standing as far above the top of the stud as may be required to allow of the movement of the curling-tool G.

F F are a pair of closing-tools, which may be brought together around the lower portion of the eye $c^3$. These tools are carried in dovetail guides $f'$ $f'$ of a carrier H. The curling-tool G is formed at its lower end with a part $g$, which just enters within the top of the eye $c^3$, and is surrounded with a groove $g'$, which as the tool G descends causes the edge of the eye $c^3$ to curl over outward until it finishes the outer end of the eye in the manner shown by Fig. 12. Clearance is left in the tools F F immediately above the portions thereof which fit around the socket $c^3$ to allow of the formation of the curl $d$. The tools F F are formed with inclined outer faces $e'$, and corresponding faces are formed in the tool E. The tools F F are brought together around the eye $c^3$ by their inclined faces sliding against the corresponding faces of the tool E as the carrier H is brought into its downward position. Each tool F is formed with a pair of outwardly-projecting arms $h$, between which is mounted a friction-roller $d'$, and as the carrier H rises the rollers $d'$ of the tools F run up the outer faces of curved fixed guides $k$, with the result that the tools F are drawn outward from one another sufficiently to clear the curled edge $d$ of the eye $c^3$ and allow the hoe C to be removed from the tools. The tools F during the earlier part of their rise bear under the curled edge $d$ and lift the eye $c^3$ from the stud $e^2$.

In lieu of drawing down the socket $c$ (shown by Fig. 3) into the form of the socket $c'$ (shown by Fig. 5) by means of the tools shown by Fig. 4 the blank C in the form shown by Fig. 3 may be placed with the bottom of its socket in the shallow recess $l$ of the lower tool $A^4$ (shown by Fig. 13) and be operated upon by the plunger $D^3$, a pressure plate or block being dispensed with, and the blank in the form in which it leaves the tools shown by Fig. 13 may be next operated upon by the tools shown by Fig. 14. These tools consist simply of the bottom tool $A^5$ and plunger $D^4$, and the socket $c'$ is drawn by them into the socket $c^2$. (Shown by Fig. 7.) In this case, also, a pressure plate or block is dispensed with. After leaving the tools shown by Fig. 14 the blank is operated upon by the tools shown by Fig. 8, and if it is required to curl over the edge of the socket or eye this is performed by the tools shown by Figs. 10 and 11 in the manner already explained. The advantage in substituting the tools shown by Figs. 13 and 14 for the tools shown by Figs. 4 and 6, respectively, is that a simpler form of press may be used, as will be obvious, and that the tools themselves are simpler and cheaper in construction.

The hoe-blades are trimmed as required and are set to the desired dish or shape in any ordinary or convenient manner, such as by means of the tools usually employed for the purpose, which also take out any wrinkles or irregularities which may be left by the operation of the previous tools.

The hoes may be made in the manner of this invention from iron or steel sheet metal which is thicker than the intended blades if an extra strength of eye is required, in which case the finished thickness of the blades may be produced in any ordinary or convenient manner.

Hoes formed in the manner of this invention while very light are also of considerable strength and constitute in themselves a very important feature of the invention.

Having thus described our invention, we claim—

1. The herein-described improvement in the art of forming hoes from sheet metal with integral eyes which consists in first forming in the blank a close-ended socket which is shallower and of larger diameter than the intended eye while the metal around the gradually-forming socket is pressed at both faces to prevent it buckling, then drawing down the metal of said socket while still close-ended until the socket is of lesser diameter and greater depth, until the required diameter and depth are reached, and then cutting away the bottom of said socket to open the eye.

2. The herein-described improvement in the art of forming hoes from sheet metal with integral eyes, which consists in first forming in the blank a socket which is shallower and of larger diameter than the intended eye, then drawing down the metal of said socket until the latter is of lesser diameter and greater depth, until the required diameter and depth are reached, then cutting away the bottom of said socket to open the eye, and finally rolling outward the margin at the outer end of the eye.

In witness whereof we have hereunto signed our names, this 30th day of June, 1899, in the presence of two subscribing witnesses.

JOHN PERKS.
WILLIAM CHARLES SALMON.

Witnesses:
STEPHEN WATKINS,
ROBERT M. LISTER.